Oct. 22, 1957          H. S. POLIN          2,810,320
PICTURE PROJECTOR AND MOVABLE DISPLAY DEVICE
Filed March 9, 1954
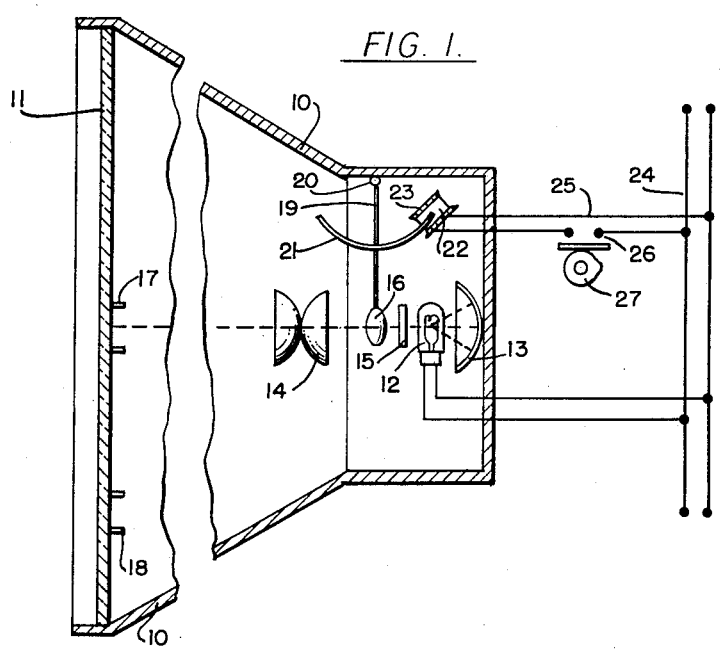
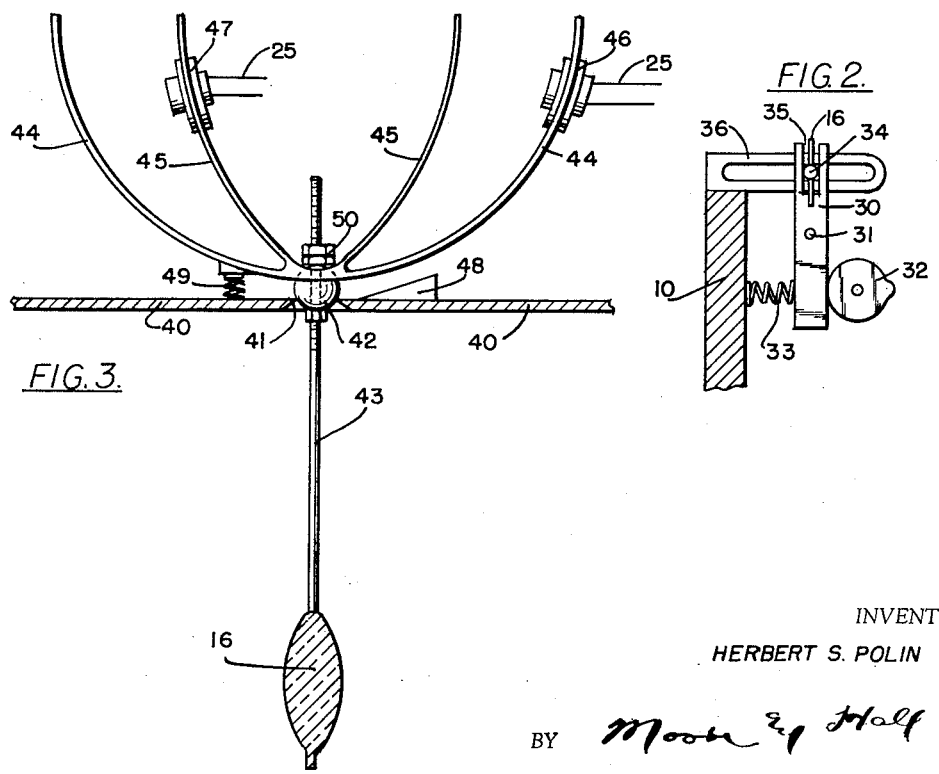
INVENTOR
HERBERT S. POLIN
BY *Moore & Hall*
ATTORNEYS

United States Patent Office 2,810,320
Patented Oct. 22, 1957

2,810,320

PICTURE PROJECTOR AND MOVABLE DISPLAY DEVICE

Herbert S. Polin, Rio de Janeiro, Brazil, assignor to Colorescent Corporation, Manhattan County, N. Y., a corporation of New York Application March 9, 1954, Serial No. 415,099

6 Claims. (Cl. 88—24)

The present invention concerns means for producing an optical effect and may be utilized to achieve motion in a normally static display or for dramatic purposes in the projection of still or motion pictures. It is an object of the invention to provide a special shadow box for the display of an enlarged photograph which may be a color transparency or the like. Color transparencies are frequently used in advertising displays, but means for attracting attention to them have heretofore been limited to flashing lights or the introduction of motion to some device or mechanism not directly a part of the photographic or illustrative portion of the display.

It is an object of the invention to provide a form of animation directly from a transparency in such a manner that the illustration itself is animated. The animation may be limited to any desired part of the illustration whereby one particular scene or object may be dramatically animated while the balance of the total view remains static. Thus, one face of a group or one object of many in the same photograph may be singled out and given a highly accented presentation embodying relative change in brilliance, size and position. This can be a most desirable effect in an advertising display.

The means for accomplishing the invention comprise a light source and an optical system, one lens of the optical train is mounted to permit movement in a prescribed path and limit, and a motor or similar means for moving said lens continuously at a desired cyclic speed.

The optical system and its arrangement will be more clearly understood by reference to the drawings in which:

Figure 1 is an elevation in section of one form the invention may take.

Figure 2 is a fragmentary elevation of a modification of a mounting for the movable lens element or the transparency producing the picture.

Figure 3 is an elevation of a universal mounting means for the movable lens element.

The drawings are intended to be merely illustrative of a few forms the invention may take and are not to be taken a limiting. Like numbers refer to like parts throughout.

A shadow or projection housing box 10 is provided with a ground glass projection screen 11, a light source 12 which is preferably in the form of a small lamp, a reflector 13 and a projection lens 14 which may be a multiple unit capable of paralleling the rays of the desired light path over an area of predetermined dimension. A picture transparency 15 is located between the light source 12 and projection lens 14. The positioning of the various elements is of course governed by the optical requirements of the system. Between the projection lens 14 and the light source 12 is suspended or otherwise mounted a movable lens elements 16, the optical properties of which are capable of altering the effective focal length of part or all of the projection system comprising reflector 13, light source 12 and projection lens 14. The movable lens element 16 may be a thick convexo-convex unit of requisite focal length which is moved by means of a mechanical drive as a variable or movable lens element whereby the size of the image desired to be emphasized when the picture transparency 15 is projected to 17 or 18, for example, on ground glass screen 11, where it is made alternately to increase and decrease in size. The mounting for the movable lens 16 comprises an arm 19 pivoted at 20 and having a balanced circular cross arm 21 arranged to enter a cylindrical passage 22 in a coil 23. That portion of curved arm 21 which moves within passage 22 has magnetic properties and may serve as an armature. Coil 23 is connected to power supply 24 by line 25 containing switch element 26. Switch element 26 is actuated by a cam 27 driven by a suitable variable speed motor geared down so that switch 26 may have a period of operation suitable for the length of arm 19 and the selected animation cycle. Although cam 27 may be varied to control the reciprocation of arm 19 and the movable lens 16, the effective length of the arm 19 and the normal speed of cam 27 are so chosen as to give an optimum effect on screen 11. Of course the speed of cam 27 may also vary cyclically.

In the system illustrated the focal lengths of parabolic reflector 13, the positioning of transparency 15 and condensing unit 14 and light source 12 comprise a system projecting a fixed focus static image of the entire transparency upon ground glass 11. The role of the movable lens 16 is to modify the size of a selected portion of the projected image. The size of movable lens 16 and its positioning determines what element of the projected static picture will be subjected to animation. It is in this selective and restricted animation of a projected static picture that the essence of the invention resides.

As cam 27 operates, switch 26 periodically makes and breaks the circuit to coil 23 which attracts or releases armature 21 causing arm 19 and the movable lens 16 to reciprocate. The movement of the movable lens 16 need not be large to produce a substantial effect at the areas 17 or 18 on ground glass screen 11. The image focused at the areas 17 or 18 will grow or diminish in size as the movable lens 16 reciprocates. While the motion of the movable lens 16 need not depart greatly from that of a straight line in the form shown in Figure 1, the modification of Figure 2 provides straight line motion if desired. Arm 30 is pivoted at 31 and urged against cam 32, which corresponds to cam 27, by compression spring 33. A rod 34 slides in slot 35 and mounts a movable lens such as 16 or a picture transparency such as 15 for horizontal translation, as determined by the guides 36.

The form shown in Figure 3 permits universal motion about two axes. A mounting plate 40 is provided with a beveled aperture 41 in which is mounted a balance 42. Rod 43 depends from balance 42 and mounts movable lens 16 at the lower end thereof. Arms 44 and 45 correspond to arm 21. Coils 46 and 47 correspond to coil 23 and may be operated simultaneously or quite independently. By means of this structure the selected portion of the picture to be animated at 17 may be made to move sidewise as well as to vary in size. Rod 43 may be adjusted by nuts 50. Suitable rubber stops 48 or light compression springs 49 may be used to limit motion.

Motion can be imparted to the movable lens 16 or the picture transparency 15 in a variety of ways, such as for example, a motor drive with a cam, a dash pot relay, or a thermally energized contraction and expansion of bimetal strips, etc. It is only necessary that its path of movement be along the optical axis of the total lens train and within the desired limits of image magnification. As the movable lens 16 moves, the projected image at 17 superimposed upon the static image of the picture transparency 15 grows larger or smaller or may be made more or less brilliant. The same optical frame may be used to obtain a like effect in a display in which the entire image is projected from a single source, for example, an image projected upon a ground glass with a conventional optical projection system, may have interposed in the system a movable lens of focal length and dimension to isolate any portion of the total scene and serve to impart a special effect to a projected scene.

It will be understood that the illuminating source 12 will suffice for the invention or there may be, if desired, a separate source for the effect alone, the source 12 being utilized to project a static image of the picture transparency 15. It will of course be obvious from the above disclosure that the optical effect of animation accomplished in the above system with a moving lens element can also be achieved by moving the picture transparency or other image source 15. A like system is applicable to a projected motion picture, in which a special animation may be imparted to only a part of the projected scene or to a camera in which the recorded scene responsive to the principal lens train of the camera has an auxiliary movable lens modulating a small selected portion of the image being recorded.

Alternatively, a small projected transparency may be combined with a large shadow box containing a large picture transparency upon which the projected image may be superimposed. Thus, the animation may be projected onto a larger static scene, causing the effect of an eye blinking, lips moving, and a myriad other forms of activation.

The position of the moving lens element in the lens train is very flexible and the effect can be achieved by the simple change in focal length of an isolated part of a projected image. The moving lens for accomplishing the animation may be a liquid cell forming a lens of proper focal dimension, the variation for animation being achieved by lowering or raising the level of the fluid in the cell, as by a small motor driven bellows or the like.

Broadly the invention resides in the discovery that the periodic distortion of a portion of a static optical path imparts animation of a desirable character to a normally static scene.

While I have described a few forms my invention may take, it is to be understood that variations of the above may be made by those skilled in the art without departing from the spirit of the invention. All such are intended to be encompassed by the generic wording of the claims.

I claim:

1. In combination, a picture projection box, a viewing screen therefor, a light source in said projection box, a reflector for said light source, an optical lens system within said box comprising said source, said reflector and a projection lens, a movable lens element of a limited size to affect a portion only of the image projected on said screen and operatively associated with said optical system, means for moving said movable element relative to move a picture transparency so that a selected limited portion of the total image projected by said optical system is caused to vary in size whereby said selected limited portion only is emphasized.

2. The combination set forth in claim 1, in which said means to cause movement is a magnetic coil having circuit breaking means associated therewith.

3. The combination set forth in claim 2, said movable element comprising a lens attached to a pendulum suspended from pivot means within said box.

4. The combination set forth in claim 3, said pendulum comprising an arm of magnetic material within the field of said magnetic coil.

5. The combination set forth in claim 4, said pendulum comprising a plurality of arms of magnetic material positioned perpendicularly to each other, a plurality of said magnetic coils, at least one for each arm, whereby said movable element can be oscillated about a plurality of axes.

6. A picture projection device comprising a closed picture projection box having a screen in one wall thereof, an optical projection system including a projection lens therein comprising a light source, a reflector condenser means for said light source and a projector lens, a movable lens element of reduced size in optical operative alignment and movably mounted between said light source and said projection lens, image transparency means positioned between said light source and said movable lens element to be projected on said screen, the size and position of said movable lens element being such that a selected portion only of the image projected on said screen is animated by movement of said movable lens element, and means to move said movable lens element.

References Cited in the file of this patent

UNITED STATES PATENTS

| | | |
|---|---|---|
| 837,368 | Wood | Dec. 4, 1906 |
| 1,228,685 | Magowan | June 5, 1917 |
| 1,454,691 | Riddell et al. | May 8, 1923 |
| 1,528,506 | Opacki | Mar. 3, 1925 |
| 1,967,161 | Simon | July 17, 1934 |
| 2,042,815 | White | June 2, 1936 |
| 2,204,709 | Straubel et al. | June 18, 1940 |
| 2,214,682 | Spacher | Sept. 10, 1940 |
| 2,244,523 | Hess | June 3, 1941 |